United States Patent
Shapiro et al.

(10) Patent No.: US 10,254,719 B2
(45) Date of Patent: Apr. 9, 2019

(54) METHOD AND APPARATUS FOR SURGE PREVENTION CONTROL OF MULTISTAGE COMPRESSOR HAVING ONE SURGE VALVE AND AT LEAST ONE FLOW MEASURING DEVICE

(71) Applicant: Statistics & Control, Inc., West Des Moines, IA (US)

(72) Inventors: Vadim Shapiro, Clive, IA (US); Andriy Nyemchyn, West Des Moines, IA (US); Alex Komm, West Des Moines, IA (US)

(73) Assignee: Statistics & Control, Inc., West Des Moines, IA (US)

( * ) Notice: Subject to any disclaimer, the term of this patent is extended or adjusted under 35 U.S.C. 154(b) by 241 days.

(21) Appl. No.: 15/279,084

(22) Filed: Sep. 28, 2016

(65) Prior Publication Data
US 2017/0082113 A1 Mar. 23, 2017

Related U.S. Application Data

(63) Continuation-in-part of application No. 15/267,654, filed on Sep. 16, 2016.
(Continued)

(51) Int. Cl.
| | |
|---|---|
| *G05D 11/00* | (2006.01) |
| *G05B 11/42* | (2006.01) |
| *F04D 17/12* | (2006.01) |
| *F04D 27/00* | (2006.01) |
| *G05B 19/416* | (2006.01) |

(Continued)

(52) U.S. Cl.
CPC ............... *G05B 11/42* (2013.01); *F02C 9/18* (2013.01); *F04D 17/12* (2013.01); *F04D 27/001* (2013.01); *F04D 27/0207* (2013.01); *F04D 27/0223* (2013.01); *G05B 19/416* (2013.01);
(Continued)

(58) Field of Classification Search
CPC .... F25B 49/022; F04D 27/02; F04D 27/0269; F04D 27/0207; G05B 11/42
See application file for complete search history.

(56) References Cited

U.S. PATENT DOCUMENTS

| | | |
|---|---|---|
| 4,142,838 A | 3/1979 | Staroselsky |
| 4,164,033 A | 8/1979 | Glennon et al. |

(Continued)

OTHER PUBLICATIONS

Neil Milligan Clark, "Improvements in or relating to Gas compression Plant" GB 807,071, pub date: Jan. 7, 1959, pp. 1-10 <Milligan.pdf>.*

*Primary Examiner* — Tuan A Vu
(74) *Attorney, Agent, or Firm* — McKee, Voorhees & Sease, PLC

(57) ABSTRACT

A method and apparatus for surge prevention control for multistage compressors with at least two stages, at least one flow measuring device, and one overall surge recycle valve is disclosed. Furthermore, a method of accurate calculation of surge limit line for overall multistage compressor using one available flow measuring device is also disclosed. The method of surge prevention calculates multistage compressor's surge limit line as a product of individual stages surge limit lines that differs from those revealed in the prior art. This method allows accurate calculation of the distance of operating point to surge limit line that takes in account surge lines of all stages and allows reliable surge prevention control.

4 Claims, 4 Drawing Sheets

Related U.S. Application Data

(60) Provisional application No. 62/220,642, filed on Sep. 18, 2015.

(51) Int. Cl.
 *F04D 27/02* (2006.01)
 *F02C 9/18* (2006.01)

(52) U.S. Cl.
 CPC .... *F05D 2240/35* (2013.01); *F05D 2270/101* (2013.01); *G05B 2219/37371* (2013.01)

(56) References Cited

U.S. PATENT DOCUMENTS

| | | |
|---|---|---|
| 4,831,535 A | 5/1989 | Blotenberg |
| 4,949,276 A | 8/1990 | Staroselsky et al. |
| 5,195,875 A | 3/1993 | Gaston |
| 5,313,779 A | 5/1994 | Rodgers |
| 5,508,943 A | 4/1996 | Batson et al. |
| 5,599,161 A | 2/1997 | Batson |
| 5,709,526 A * | 1/1998 | McLeister ........... F04D 27/0207 415/1 |
| 5,726,891 A | 3/1998 | Sisson et al. |
| 5,743,715 A | 4/1998 | Staroselsky et al. |
| 5,798,941 A * | 8/1998 | McLeister .............. G05B 11/42 415/1 |
| 5,908,462 A | 6/1999 | Batson |
| 6,503,048 B1 | 1/2003 | Mirsky |
| 6,558,113 B2 | 5/2003 | Blotenberg |
| 7,094,019 B1 | 8/2006 | Shapiro |

\* cited by examiner

METHOD AND APPARATUS FOR SURGE PREVENTION CONTROL OF MULTISTAGE COMPRESSOR HAVING ONE SURGE VALVE AND AT LEAST ONE FLOW MEASURING DEVICE

CROSS-REFERENCE TO RELATED APPLICATIONS

This application is a continuation-in-part of U.S. Ser. No. 15/267,654, filed Sep. 16, 2016, which claims priority under 35 U.S.C. § 119 to provisional application Ser. No. 62/220,642, filed Sep. 18, 2015, both of which are herein incorporated by reference in their entirety.

FIELD OF THE INVENTION

The invention relates generally to a method and apparatus for surge prevention control. More specifically, but not exclusively, the invention relates to a method and apparatus for surge prevention control for multistage compressors with at least two stages, at least one flow measuring device, and one overall surge recycle valve is disclosed. Even more specifically, but not exclusively, the invention relates to a method of accurate calculation of surge limit line for overall multistage compressor using one available flow measuring device.

BACKGROUND OF THE INVENTION

Since a flow-measuring device often is not available between stages, it is difficult to calculate the distance of operating point to surge limit line and perform protective regulatory control action.

BRIEF SUMMARY OF THE INVENTION

Therefore, it is a primary object, feature, and/or advantage of the invention to improve on and/or overcome the deficiencies in the art.

The purpose of this invention is to accurately calculate surge limit line for multistage compressor having one available flow-measuring device. The method is applicable with many types of multistage centrifugal turbo compressors with variable speed, or constant speed and throttle valve for process control.

These and/or other objects, features, and advantages of the invention will be apparent to those skilled in the art. The invention is not to be limited to or by these objects, features and advantages. Obviously many variations of the present invention are possible. Within the scope of present claim the invention can be accomplished otherwise then specifically described below. No single embodiment need provide each and every object, feature, or advantage.

Figure 1:
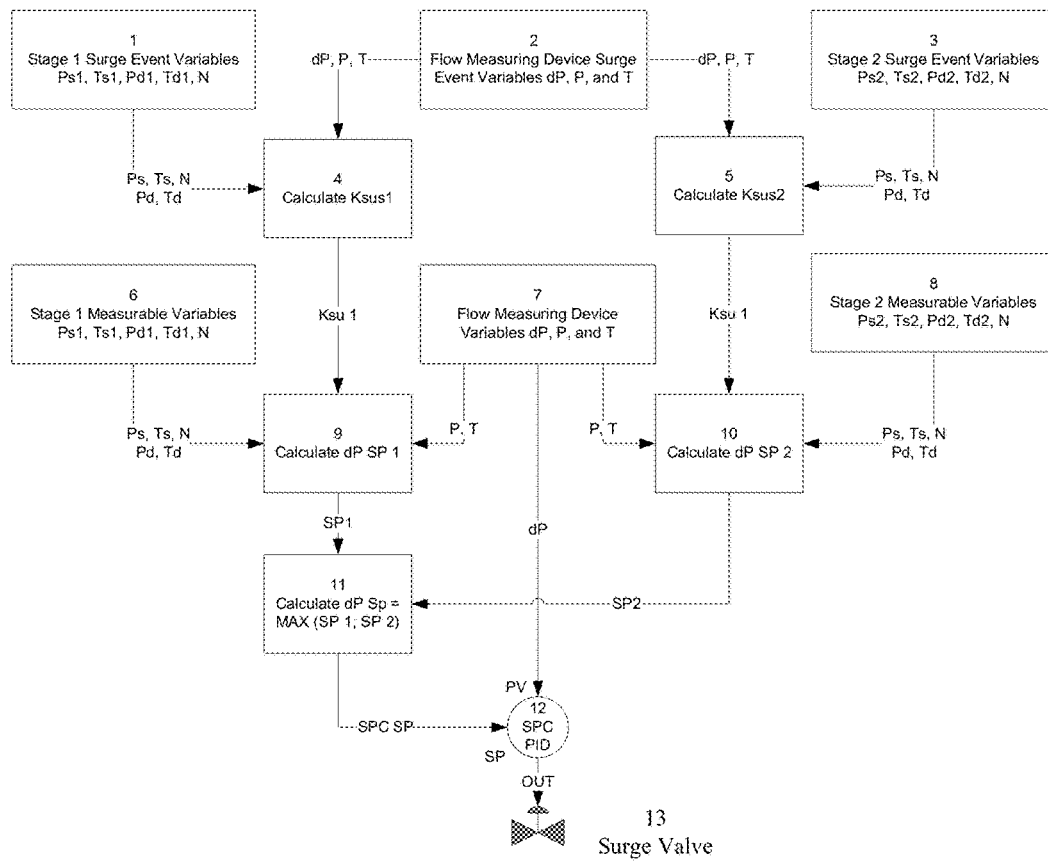
FIG. 1 shows a surge prevention algorithm for multistage compressor having one available flow-measuring device and one recycle valve.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The invention is directed towards a method and apparatus for surge prevention control. More specifically, but not exclusively, the invention relates to a method and apparatus for surge prevention control for multistage compressors with at least two stages, at least one flow measuring device, and one overall surge recycle valve is disclosed. Even more specifically, but not exclusively, the invention relates to a method of accurate calculation of surge limit line for overall multistage compressor using one available flow measuring device.

Figure 3:
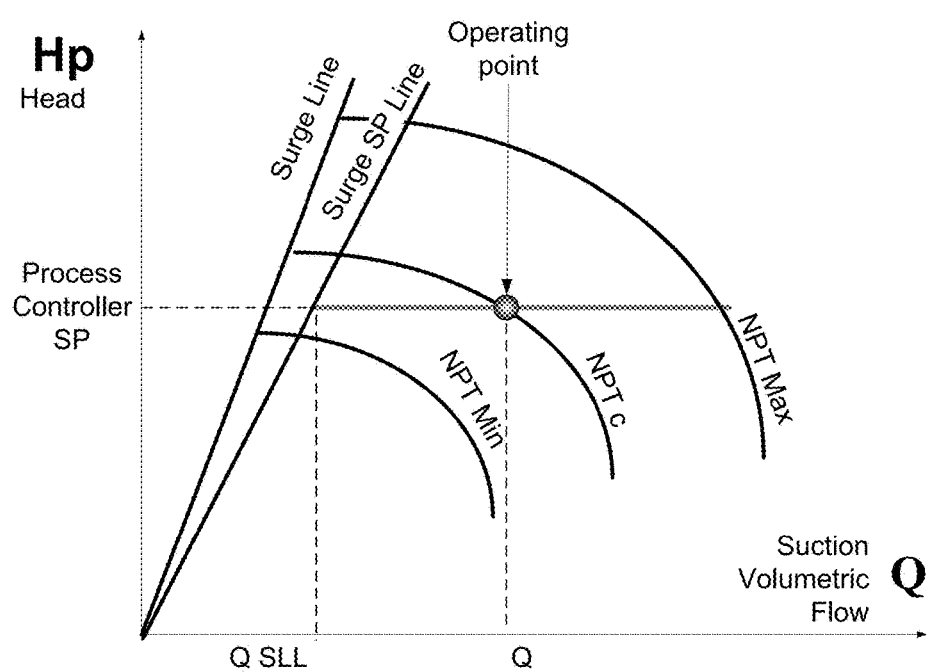
FIG. 3 shows a typical compressor map with coordinates provided in terms of polytrophic head versus suction volumetric flow.

The FIG. 3 is typical compressor map. It shows the location of compressor operating point, marked by a blue dot symbol, in reference to various constraints, represented by the limiting lines and performance curves. The performance of centrifugal compressors is best presented in a map showing polytrophic head as a function of the actual inlet flow, with the compressor speed (or inlet guide vanes position) as a parameter. The compressor map contains the following number of constructed lines which are based on manufacturer supplied data and controller real time data:

Performance curves represent possible combinations of flow and pressure for a given speed of rotation and vane setting. FIG. 3 shows performance curves for three different speeds (N_Min, N_c and N_Max).

The surge line dividing a stable operating region from surge region. To protect a compressor from surge it must be known at what point this event occurs. The surge limit line is built on information received from the compressor manufacturer specification, or surge test data. This line represents actual points at which the compressor surges.

The compressor polytrophic head can be computed from the suction and discharge pressure and temperature and process gas composition. An operating point on a specific curve can be computed via well-known equations below:

$$H_p = \frac{(R_c^\sigma - 1)}{\sigma} * \frac{R_0 * T_s * Z_a}{MolW} \qquad 4\text{-}1$$

Where
$H_p$ is the polytrophic head in the compressor discharge
$R_c$ is the compression ratio
$\sigma$ is the gas polytrophic exponent
$T_s$ is the gas suction temperature
$Z_a$ is the average gas compressibility factor
MolW is the gas molecular weight
$R_0$ is the universal gas constant.
With the polytrophic exponent:
And $$\sigma = \frac{n-1}{n} = \frac{k-1}{k*\eta} \qquad 4\text{-}2$$

where
n is the gas polytrophic volume exponent
η is the compressor efficiency
k Is isentropic exponent It is well known that the relationship between the temperature and the compression ratio for the polytrophic processes can be presented with the following formula:

$$\frac{T_d}{T_s} = \left(\frac{P_d}{P_s}\right)^\sigma \qquad 4\text{-}3$$

Therefore, the polytrophic exponent G can be calculated as follows where
$T_d$ is the gas discharge temperature $$\sigma = \frac{\log\left(\frac{T_d}{T_s}\right)}{\log\left(\frac{P_d}{P_s}\right)} \qquad 4\text{-}4$$

The actual flow can be calculated via the following equation:
And $$Q_s = A\sqrt{\frac{dP * T_s * Z_s}{P_s * \text{MolW}}} \qquad 4\text{-}5$$

where
$k_q$ is a constant coefficient, or
A is a flow measuring device constant coefficient
$Q_s$ is volumetric flow in the compressor suction
$Z_s$ is the compressor suction gas compressibility factor
dP is the pressure differential across the flow measuring device in the compressor suction
And density $$\rho = \frac{\text{MolW} * P_s}{R_0 * T_s * Z} \qquad 4\text{-}6$$

Figure 2:
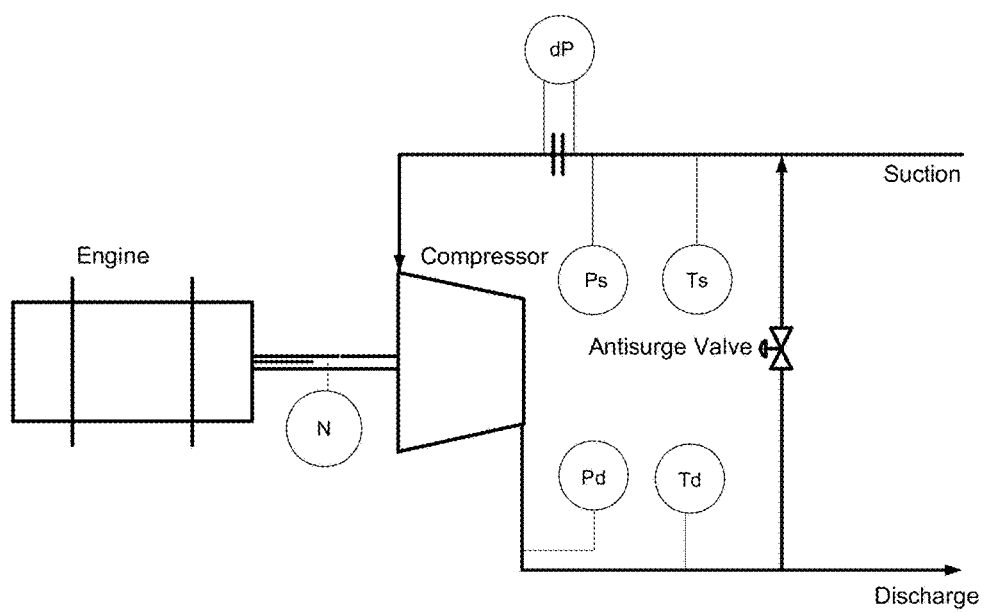
FIG. 2 shows a general turbo compressor with variable speed drive and sensors arrangements.

The compression ratio $R_c$ is computed as follows:

$$R_c = \frac{P_d}{P_s} \qquad 4\text{-}7$$

where
$P_d$ is the gas pressure in the compressor discharge
$P_s$ is the gas pressure in the compressor suction The FIG. 2 shows a typical Surge Prevention Control System of single stage compressor, which comprises compressor's measurable variables. Surge prevention algorithm uses measurable variables and determines distance to surge that is invariant to changing process conditions. This distance between the compressors's operating point and the surge line is a function of the compression ratio, differential pressure across flow measurement device, the rotational speed (the guide vane angle) and the gas pressure, temperature, and composition. Surge Prevention Control Algorithm uses the surge test data (or manufacturer specified data) recorded for a certain compressor rotational speed/guide vanes position $k_{su}$ surge coefficient is computed as:

$$k_{su} = \frac{H_{psu}}{Q_{ssu}^2} \qquad 4\text{-}8$$

where
$H_{psu}$ is surge polytrophic head in the compressor discharge
$Q_{ssu}$ is surge volumetric flow in the compressor suction
Or using the equations above:

$$k_{su} = \frac{(R_{csu}^\sigma - 1)}{\sigma} * \frac{P_{ssu}}{dP_{ssu}} \qquad 4\text{-}9$$

where
$R_{csu}$ is surge pressure ratio
$P_{ssu}$ is surge test suction pressure
$dP_{su}$ is surge test pressure differential across the flow measuring device in the compressor suction The surge control line Set Point (SPsu) defines the desired minimum distance between the operating point and surge limit line. The SPsu is always to the right of the surge line. The surge control margin is the distance between those lines. The Control Line Set Point (SPsu) is calculated by multiplying the Surge Line dPssu value by the Control Line Multiplier (CLM).

$$SP_{su} = dP_{ssu} * CLM = \frac{(R_c^\sigma - 1)}{\sigma} * \frac{Ps}{k_{su}} * CLM \qquad 4\text{-}10$$

where
$R_c$ is current pressure ratio
Ps is current suction pressure
$dP_{su}$ is current surge line pressure differential across the flow measuring device in the compressor suction The SPC PID process variable is current pressure differential across the flow measuring device (dP). The SPC PID response increases the recycle rate when the operating point is to the left of SPsu by opening of surge control valve and reduces recycle rate when that point is to the right of SPsu by closing of surge control valve.

Strictly speaking, Surge Prevention Control algorithm of single stage compressor is not part of the disclosed invention as a claim, however, its overview is provided for completeness purposes only.

Figure 4:
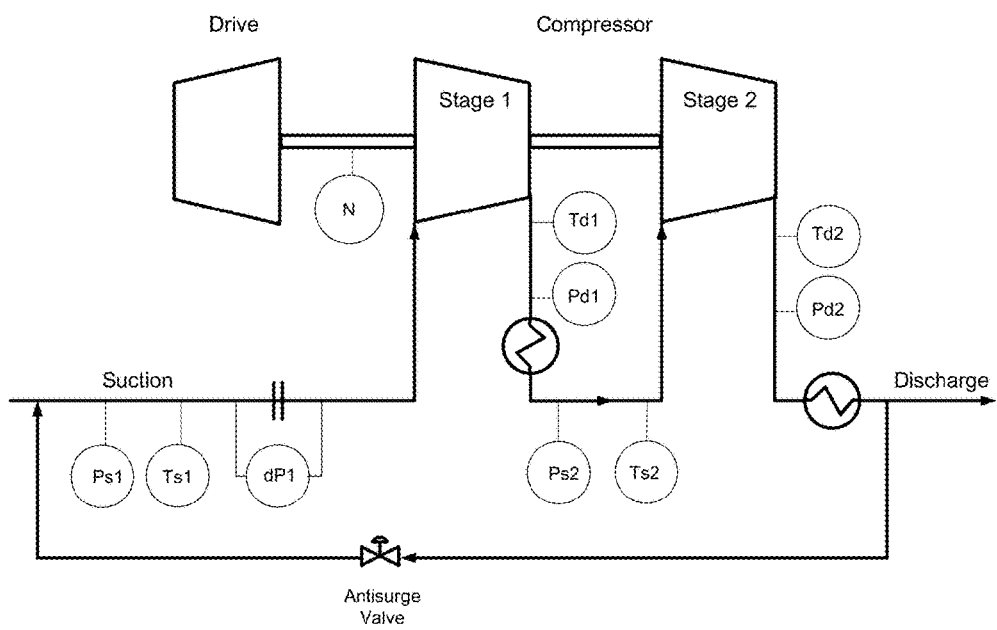
FIG. 4 shows a general multistage turbo compressor with one available flow-measuring device in the suction of first stage and one overall recycle valve.

FIG. 4 shows a general multistage turbo compressor with one available flow-measuring device in the suction of first stage and one overall recycle valve. The standard approach consists of the following steps:

1. Each stage of a compressor is equipped with its own PID surge prevention controller even if there is only one recycle path and control valve for the entire machine.
2. If the flow measuring device is not located in suction, of compressor stage then the equation 5-11 is needed to convert flow to suction condition. The equation is used to calculate virtual flow measurements for stages with no flow measuring devices. It is derived from mass and energy balances and calculates differential pressure across each stage virtual flow measuring device (dPv) as function of differential pressure across available flow measured device and ratios of surge conditions pressures, temperatures, and compressibility at the point of available flow measurement and point of virtual flow measuring device location.

$$dP_v = \frac{P * T_v * Z_v}{P_v * T * Z} dP \qquad 4\text{-}11$$

3. Each stage is equipped with Surge Prevention Controller described on FIG. 2. PID algorithm of Surge Prevention Controller calculates control response. This response represents the intended recycle flow.
4. All PID controllers submit their control responses to the valve-sharing selector.
5. The response of a valve-sharing algorithm is used to manipulate the recycle valve. The selector protects the entire compressor from surge by selecting the highest of several PID algorithm responses of individual Surge Prevention Controllers.

Implementation

The standard approach overcomplicates control system setup, and reduce systems reliability. The advantage of the present invention over the standard approach is it does not require complex configuration of individual companion Surge Prevention Controller and uses only one controller to protect entire machine. A disclosed method focuses on reliable Surge Prevention control of entire multistage compressor while simplifying the control system configuration and minimizing interaction between control modules.

The overall algorithm is described in FIG. 1. This control diagram illustrates the strategy of multistage Surge Prevention Controller. Proposed method consists of the following steps:

1. Record surge data based on compressor manufacturer's information, or surge test data. It includes values of each stage measured variables—pressure suction, pressure discharge, temperature suction, temperature discharge, speed (FIGS. 1: 1 and 3), and flow measuring device variables—differential pressure, pressure, temperature (FIG. 1: 2).
2. Determining a surge limit line set point of each compressor stage ($k_{suv}$) as a function of surge conditions reduced polytrophic head $$\left( \frac{R_c^\sigma - 1}{\sigma} \right)$$

and reduce volumetric flow rate $$\left( \frac{dP_v}{P} \right)$$

(FIGS. 1-4 and 5):

$$k_{suv} = \frac{1}{dP_{ssu}} * \frac{P_v^2 * T_{ssu} * Z_{ssu}}{P_{ssu} * T_v * Z_v} * \frac{R_{csu}^\sigma - 1}{\sigma} \qquad 6\text{-}12$$

where
$R_{csu}$ is compressor pressure ratio at surge conditions
$P_{ssu}$ is surge test pressure at flow measuring device $dP_{ssu}$ is surge test pressure differential across the flow measuring device
$T_{ssu}$ is surge test temperature at flow measuring device
$Z_{ssu}$ is surge test compressibility at flow measuring device
$P_v$ is surge test pressure in the compressor stage suction
$T_v$ is surge test temperature in the compressor stage suction
$Z_v$ is surge test compressibility in the compressor stage suction 3. Sensing Stage 1 and Stage 2 variables—pressure suction, pressure discharge, temperature suction, temperature discharge, and speed (FIGS. 1: 6 and 8).
4. Sensing flow measuring device variables—differential pressure, pressure, temperature (FIG. 1: 7).
5. Calculate each stage current surge limit line pressure differential across the flow measuring device in the compressor suction (FIGS. 1: 9 and 10):

$$dP_{ssui} = \frac{1}{k_{suv}} * \frac{P_v^2 * T * Z}{P * T_v * Z_v} * \frac{R_{ci}^\sigma - 1}{\sigma} \qquad 6\text{-}13$$

where
$R_{ci}$ is compressor stage pressure ratio at current conditions
P is pressure at flow measuring device at current conditions
T is temperature at flow measuring device at current conditions
Z is compressibility at flow measuring device at current conditions
$P_v$ is pressure in the compressor stage suction at current conditions
$T_v$ is temperature in the compressor stage suction at current conditions
$Z_v$ is compressibility in the compressor stage suction at current conditions 6. Computing overall compressor surge limit set point for current operating conditions by selecting maximal value of all computed individual stages surge limit set points (FIG. 1: 11):

$$dP_{ssu} = \text{MAX}(dP_{ssu}) \qquad 6\text{-}14$$

7. The Control Line Set Point (SPsu) is calculated by multiplying the Surge Line dPssu value by the Control Line Multiplier (CLM):

$$SP_{su} = dP_{ssu} * CLM \qquad 6\text{-}15$$

Comparing current measured dP with computed overall compressor surge limit set point $SP_{su}$ and modulating surge control valve. PID algorithm of Surge Prevention Controller calculates control response. This response represents the intended recycle flow (FIG. 1: 12).

What is claimed is:
1. An apparatus for surge prevention control, said apparatus comprising: multistage compressors with at least two stages, at least one flow measuring device, and one surge valve, said stages each being equipped with a PID surge prevention controller and said multistage compressors being capable of performing at least a six-step method comprising processor-executed steps using mathematical capabilities implementing control of controller, the method steps comprising:
first, determining a surge limit line set point of each compressor stage ($k_{suv}$) as a function of surge conditions reduced polytrophic head

$$\left(\frac{R_c^\sigma - 1}{\sigma}\right)$$

and reduce volumetric flow rate $$\left(\frac{dP_v}{P}\right):$$

$$k_{suv} = \frac{1}{dP_{ssu}} * \frac{P_v^2 * T_{ssu} * Z_{ssu}}{P_{ssu} * T_v * Z_v} * \frac{R_{csu}^\sigma - 1}{\sigma},$$

where $R_{csu}$ is compressor pressure ratio at surge conditions, $P_{ssu}$ is compressor pressure ratio at surge conditions, $dP_{ssu}$ is surge test pressure differential across the at least one flow measuring device, $T_{ssu}$ is surge test temperature at the at least one flow measuring device, $Z_{ssu}$ is surge test compressibility at the at least one flow measuring device, $P_v$ is surge test pressure in a compressor stage suction, $T_v$ is surge test temperature in the compressor stage suction, and $Z_v$ is surge test compressibility in the compressor stage suction;

second, calculating each stage differential pressure surge limit set point for current operating conditions as a function of the surge limit line set point of each compressor stage ($k_{suv}$) and current measured pressures and temperatures:

$$dP_{ssui} = \frac{1}{k_{suv}} * \frac{P_v^2 * T * Z}{P * T_v * Z_v} * \frac{R_{ci}^\sigma - 1}{\sigma},$$

where $R_{ci}$ is compressor pressure ratio at current conditions, P is pressure at the at least one flow measuring device at current conditions, T is temperature at the at least one flow measuring device at current conditions, Z is compressibility at the at least one flow measuring device at current conditions, $P_v$ is pressure in a compressor stage suction at current conditions, $T_v$ is temperature in the compressor stage suction at current conditions, and $Z_v$ is compressibility in the compressor stage suction at current conditions;

third, computing overall compressor surge limit set point for current operating conditions ($dP_{sp}$) by selecting maximal value of all computed individual stages surge limit set points (MAX($dP_{spi}$)):

$$dP_{sp} = MAX(dP_{spi});$$

fourth, calculating control line set point ($SP_{su}$) by multiplying surge line ($dP_{ssu}$) value by a control line multiplier (CLM):

$$SP_{su} = dP_{ssu} * CLM;$$

fifth, comparing current measured dP with the control line set point ($SP_{su}$); and sixth, modulating surge control valve based on comparison for compressor surge prevention.

2. The apparatus of claim 1, wherein for a variable speed compressor the drive surge limit set points of each stage are determined as a function of speed (N).

3. An apparatus for accurately calculating surge limit line, comprising:
a multistage compressor equipped with a PID surge prevention controller using one available flow measuring device, one speed signal, pressure and temperature signals of suction and discharge of each stage, said multistage compressor capable of performing a method comprising processor-executed steps using mathematical capabilities implementing control of the controller, the method steps comprising:

first, determining a surge limit line set point of each compressor stage ($k_{suv}$) as a function of surge conditions reduced polytrophic head $$\left(\frac{R_c^\sigma - 1}{\sigma}\right)$$

and reduce volumetric flow rate $$\left(\frac{dP_v}{P}\right):$$

$$k_{suv} = \frac{1}{dP_{ssu}} * \frac{P_v^2 * T_{ssu} * Z_{ssu}}{P_{ssu} * T_v * Z_v} * \frac{R_{csu}^\sigma - 1}{\sigma},$$

where $R_{csu}$ is compressor pressure ratio at surge conditions, $P_{ssu}$ is compressor pressure ratio at surge conditions, $dP_{ssu}$ is surge test pressure differential across the at least one flow measuring device, $T_{ssu}$ is surge test temperature at the at least one flow measuring device, $Z_{ssu}$ is surge test compressibility at the at least one flow measuring device, $P_v$ is surge test pressure in a compressor stage suction, $T_v$ is surge test temperature in the compressor stage suction, and $Z_v$ is surge test compressibility in the compressor stage suction;

second, calculating each stage differential pressure surge limit set point for current operating conditions as a function of the surge limit line set point of each compressor stage ($k_{suv}$) and current measured pressures and temperatures:

$$dP_{ssui} = \frac{1}{k_{suv}} * \frac{P_v^2 * T * Z}{P * T_v * Z_v} * \frac{R_{ci}^\sigma - 1}{\sigma},$$

where $R_{ci}$ is compressor pressure ratio at current conditions, P is pressure at the at least one flow measuring device at current conditions, T is temperature at the at least one flow measuring device at current conditions, Z is compressibility at the at least one flow measuring device at current conditions, $P_v$ is pressure in a compressor stage suction at current conditions, $T_v$ is temperature in the compressor stage suction at current conditions, and $Z_v$ is compressibility in the compressor stage suction at current conditions;

third, computing overall compressor surge limit set point for current operating conditions ($dP_{sp}$) by selecting maximal value of all computed individual stages surge limit set points (MAX($dP_{spi}$)):

$$dP_{sp} = MAX(dP_{spi});\text{ and}$$

fourth, calculating control line set point ($SP_{su}$) by multiplying surge line $dP_{ssu}$ value by control line multiplier (CLM):

$$SP_{su} = dP_{ssu} * CLM;$$

fifth, comparing current measured dP with the control line set point ($SP_{su}$); and sixth, modulating surge control valve based on comparison for compressor surge prevention.

4. The apparatus of claim 3, wherein for a variable speed compressor drive surge limit set points of each stage are also determined as a function of speed (N).

\* \* \* \* \*